H. W. C. THOMAS & S. H. KNOX.
Hitching-Post.
No. 209,090. Patented Oct. 15, 1878.
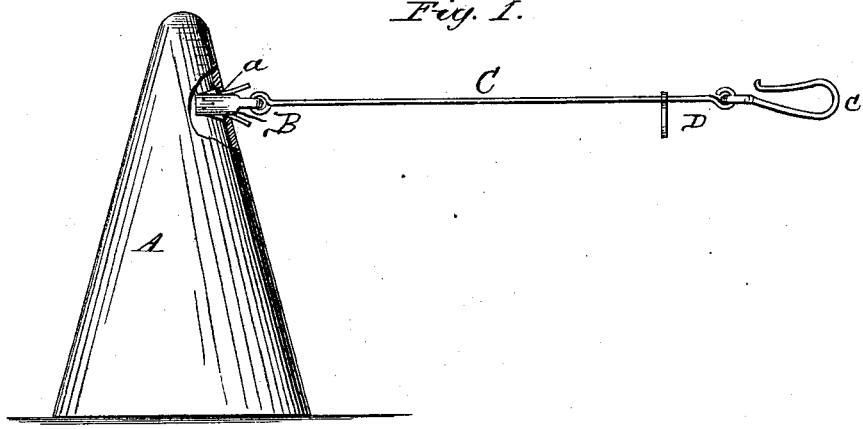
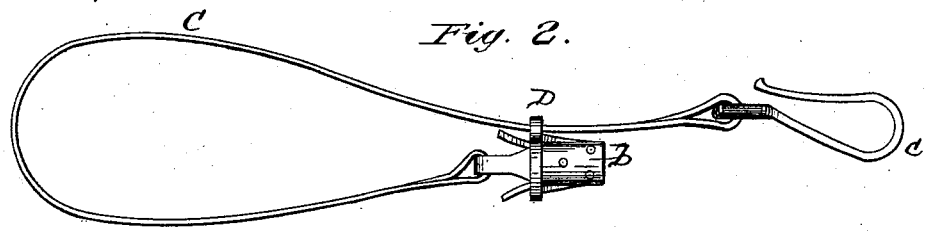
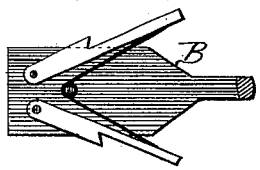
Witnesses.
Inventor
Henry W. C. Thomas
Salathiel H. Knox
by their Attys
Peck & Ritchie

UNITED STATES PATENT OFFICE.

HENRY W. C. THOMAS AND SALATHIEL H. KNOX, OF SPRINGFIELD, OHIO.

IMPROVEMENT IN HITCHING-POSTS.

Specification forming part of Letters Patent No. 209,090, dated October 15, 1878; application filed March 30, 1878.

*To all whom it may concern:*

Be it known that we, HENRY W. C. THOMAS and SALATHIEL H. KNOX, of Springfield, in the county of Clarke and State of Ohio, have invented certain new and useful Improvements in Hitching-Posts; and we do hereby declare the following to be a full, clear, and exact description of the same, reference being made to the accompanying drawing, forming a part of this specification, and in which—

Figure 1 is a perspective view of the post, with a portion broken away, showing the application of the spring-clip. Fig. 2 is a side elevation of the hitching-strap and spring-clip; Fig. 3, an enlarged sectional view of the spring-clip.

The object of our invention is the construction of a hitching-post which can only be used in connection with a device connected with the hitching-strap, which is adapted to be secured to the post; and the invention consists of a hitching-post consisting of a case or shell having a smooth outer surface, and gradually tapering from its base to the top thereof, and provided with an opening adapted for the insertion of a spring-clip connected to a hitching-strap, to engage with the inner wall of the case or shell, all as hereinafter fully described.

In the drawing, A represents a case or shell having a smooth outer surface, and made of any suitable material. This case or body is made conical in shape and gradually tapering from its base to the top thereof, so that the hitching-strap cannot be secured around the same without slipping over the top of the post. In the present instance the post is made conical in shape, but we do not desire to be limited thereto, as it may be made hexagonal, prismoidal, or any other desired shape, having the body, however, made gradually tapering from the base to the top thereof, as before described. The post is provided with a hole or opening, *a*, for the insertion of a spring-clip, or its equivalent, connected with the hitching-strap C.

In Figs. 2 and 3, we have shown a double-spring clip secured to a hitching-strap, said clip B having a circular head, *b*, adapted to be passed into or through the hole or opening in the post, said clip engaging with the inner wall of said case or body, thus securing the hitching-strap thereto. The hitching-strap is also provided with a ring, D, through which the spring-clip passes and engages when it is desired to secure the strap around or to rings or other devices connected with the common or ordinary posts. The hitching-strap is also provided with a hook, *c*, by which it can be connected to the horses' bridle-bits.

We do not desire to be limited to the spring-clip herein shown, or the shape of hole or opening in the post, as it may be formed in any desired shape to correspond with any desired spring-clip, or its equivalent, connected with the hitching-strap.

By the above-described form of post it will be observed that there is no possible chance of securing a horse or other animal thereto unless the hitching-strap is provided with a device adapted to fit the hole or opening contained therein.

We claim as our invention—

A hitching-post consisting of a case or shell, A, having a smooth outer surface and gradually tapering from its base to the top thereof, and provided with an opening, *a*, adapted for the insertion of a spring-clip connected with a hitching-strap, to engage with the inner wall of the case or shell, substantially as and for the purpose specified.

Witness our hands this 23d day of March, A. D. 1878.

HENRY W. C. THOMAS.
SALATHIEL H. KNOX.

Witnesses:
O. B. JOHNSON,
JAS. JOHNSON, Jr.